United States Patent [19]
Dickson, Jr. et al.

[11] Patent Number: 5,974,567
[45] Date of Patent: Oct. 26, 1999

[54] GHOST PARTITION

[75] Inventors: Charles Hudgens Dickson, Jr., Spring; J. Scott Harsany; Matthew W. Armold, both of Houston; Anthony Ty Marler, Montgomery, all of Tex.

[73] Assignee: Compaq Computer Corporation, Houston, Tex.

[21] Appl. No.: 08/879,912

[22] Filed: Jun. 20, 1997

[51] Int. Cl.$^6$ .......................... G06F 11/22; G06F 11/267
[52] U.S. Cl. .................................. 714/27; 714/36; 713/1; 713/100
[58] Field of Search .................. 395/183.01, 183.06, 395/183.03–183.12; 713/1, 2, 100; 711/173

[56] References Cited

U.S. PATENT DOCUMENTS

| | | | |
|---|---|---|---|
| 4,057,847 | 11/1977 | Lowell et al. | 395/183.22 |
| 4,823,343 | 4/1989 | Takahashi | 395/183.22 |
| 5,021,997 | 6/1991 | Archie et al. | 395/183.07 |
| 5,124,622 | 6/1992 | Kawamura et al. | 318/569 |
| 5,361,358 | 11/1994 | Cox et al. | 395/700 |
| 5,367,667 | 11/1994 | Wahlquist et al. | 395/183.22 |
| 5,371,883 | 12/1994 | Gross et al. | 395/183.14 |

(List continued on next page.)

FOREIGN PATENT DOCUMENTS 0 794 484 A2  9/1997  European Pat. Off. .......... G06F 3/06

OTHER PUBLICATIONS

Quarterdeck Corp., "Clean Sweep 95 User's Guide", pp. 69–82, 1994–95.
Olsen, J.W., "UnInstaller 3 Slowly Cleans, Moves and Archives", PC Magazine, v14 n14 p42(1), Aug. 1995.

*Primary Examiner*—Robert W. Beausoliel, Jr.
*Assistant Examiner*—Scott T. Baderman
*Attorney, Agent, or Firm*—Akin, Gump, Strauss, Hauer, & Feld

[57] ABSTRACT

An apparatus and a method for storing diagnostic software on a data storage device provides one or more ghost partitions overlapping a user partition on a data storage device. During a factory download of the application software as well as the diagnostics software, the apparatus creates a user partition and one or more overlapping ghost partitions. Next, it determines a minimum and maximum partition size for the ghost partition(s) and allocates the ghost partition size(s) appropriately. The apparatus then creates one or more master boot records (MBRs), one for each created partition. The ghost partition containing the diagnostics software is set as the active partition to allow the diagnostic software to be executed. Upon completion of the diagnostics process, the MBR for a second ghost partition is enabled so that upon reboot, download verification software located on a second ghost partition can be executed to ensure the correctness of the software downloading process. Next, the ghost partitions are disabled to reclaim storage space back to the user partition and the MBR for the user partition is set as the active partition so that upon reboot, only user partitions are visible. Further, in the event that the diagnostics software needs to be executed for quality control purposes, the MBR containing data on the ghost partition with the diagnostics software replaces the MBR for the user partition so that the ghost partition with diagnostics software can be resurrected after it has been previously disabled. No master boot records for any of the user or system partitions are modified at any time during the process. Additionally, the MBR and file allocation table (FAT) for the ghost partition may be cleared so test data cannot be accessed after the factory test processes. Since the ghost partitions overlap user partitions, after the ghost partitions have been disabled, data storage is automatically reclaimed by the user partitions when needed. The ghost partitions can properly function while overlapping the user partitions because while in the controlled environment of the factory, data will not be arbitrarily written to the user partition (otherwise both user and ghost partition data could become corrupt). Thus, the present invention avoids the need to set up a large system partition and avoids wasting disk space associated with manufacturing diagnostics.

30 Claims, 7 Drawing Sheets

U.S. PATENT DOCUMENTS

| | | | |
|---|---|---|---|
| 5,388,252 | 2/1995 | Dreste et al. | 395/183.22 |
| 5,390,324 | 2/1995 | Burckhartt et al. | 395/185.08 |
| 5,455,933 | 10/1995 | Schieve et al. | 395/183.2 |
| 5,469,573 | 11/1995 | McGill, III et la. | 395/700 |
| 5,513,319 | 4/1996 | Finch et al. | 395/185.08 |
| 5,574,914 | 11/1996 | Hancock et al. | 395/650 |
| 5,629,878 | 5/1997 | Kobrosly | 395/183.01 |
| 5,657,473 | 8/1997 | Killean et al. | 395/490 |
| 5,675,769 | 10/1997 | Ruff et al. | 395/497.04 |
| 5,826,012 | 10/1998 | Lettvin | 395/186 |

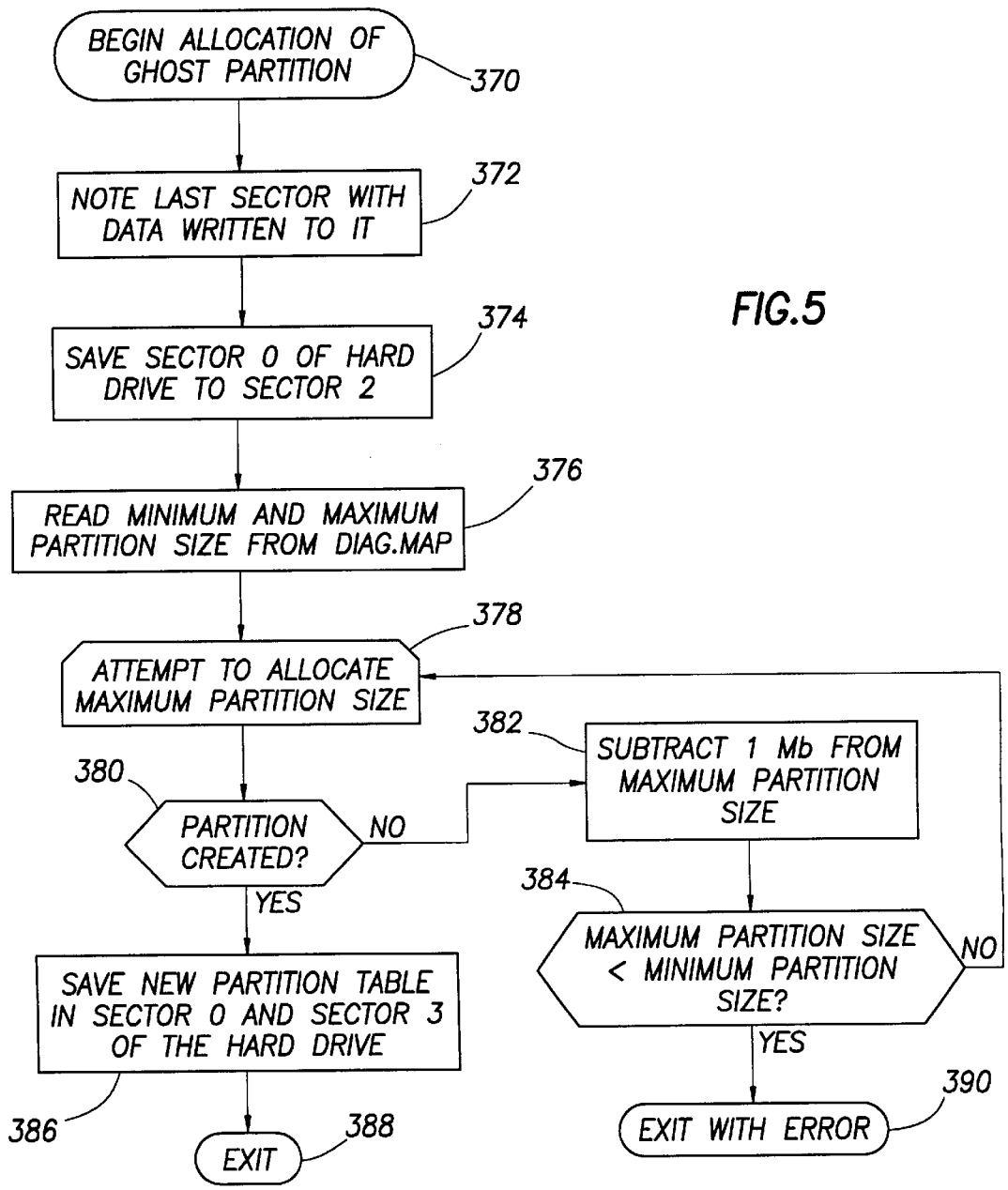

GHOST PARTITION

CROSS-REFERENCE TO RELATED APPLICATIONS

The following disclosures are hereby incorporated by reference:

U.S. application Ser. No. 08/774,808, filed on Dec. 31, 1996, entitled "MULTI-TASKABLE DIAGNOSTICS MODULE," by J. Scott Harsany, Robert Perugini, and Robert E. Supak;

U.S. application Ser. No. 08/777,902, filed on Dec. 31, 1996, entitled "DIAGNOSTICS MODULE DISPATCHER," by J. Scott Harsany, Robert Perugini, and Robert E. Supak; and U.S. application Ser. No. 08/775,778, filed on Dec. 31, 1996, entitled "TEST DEFINITION TOOL," by A. Lee Jenkins, J. Scott Harsany, and Robert Perugini.

BACKGROUND OF THE INVENTION

1. Field of the Invention

The present invention is directed in general to computer diagnostics system, and more particularly, to an apparatus and a method for creating and deleting a partition on a data storage device with the diagnostic system.

2. Description of the Related Art

The continual reduction in size and cost of personal computers has been instrumental in the rapid acceptance of computer technology by corporations and consumers. Even with ultra large scale integration technology, which reduces the number of components in personal computers, these personal computers are still highly complex hardware assemblies. Thus, even computers assembled using high quality components and careful assembly procedures are still subject to occasional manufacturing defects and failures during use.

The costs associated with such defects and failures in terms of manufacturer warranty obligations and end user down time are relatively high. Thus, users are demanding that their computer be reliable and be available at virtually any time. Computers, however, can experience problems associated with any one of their major components, such as the hard drive, the display, the memory, and the processor. It is important, therefore, to provide a diagnostic capability for the computer system that can test the operation of the computer in a multi-tasking environment to closely simulate the actual environment that the computer system operates in.

To satisfy such requirements, prior to the delivery of the computers to end users following the manufacture or subsequent repair, the computer circuit boards are normally subjected to functional tests to determine whether they operate properly. Furthermore, during use, the user may experience problems relating to either hardware problems or improper software configurations. To isolate the fault, the user may wish to subject his or her computer system to the functional tests to satisfy the user that the hardware or driver level software is not the culprit of the problems.

One type of diagnostic program is embedded into a non-volatile memory of the computer. In an IBM compatible personal computer, the test is called "Power On Self Test" (POST) and is arranged in personal computers as a portion of the basic input/output system (BIOS). Such BIOS-POST diagnostic program is executed automatically and mandatorily when the computer system boots. One problem that occurs with the placement of test codes in the BIOS-POST diagnostic program is the execution speed and the size of the actual code. First, users do not want to wait for an extensive diagnostic testing during each boot. Therefore, the POST-diagnostics routines cannot be as sophisticated and as thorough as possible. Furthermore, the POST diagnostics routine is constrained by tight memory requirements, and therefore is limited to simple and time-efficient tests without an easy to use graphical user interface inherently present in the Windows interface.

Another functional testing method employs specialized diagnostics software which is transferred to the computer system under test via one or more disks. The testing software is typically loaded onto the computer to be tested and a technician or a user initiates the execution of the software for testing the computer. The diagnostic software is designed to test the operation and interconnection of the circuit board components and other hardware, and to provide graphic displays on the monitor indicating the nature of any identified faults. Diagnostic software of this type is commercially available for most computer system manufacturers and original equipment manufacturers. Additionally, after-market diagnostic software is also commercially available from independent software vendors.

One disadvantage caused by disk-based test or diagnostics tools is the need to completely remove the test software from the data storage device upon completion of such test. Traditionally, such removal entails the execution of an uninstall software which ensures that various Windows files relating to the test software are removed that the Windows INI file is properly updated. The execution of such uninstall software in a production environment is undesirable due to the time and expense associated with executing and monitoring the uninstall software. Further, the user's Windows INI files may become corrupted during the uninstall process. Thus, it is desirable to install the disk operating system as well as the test software on the target computer at once and quickly and completely reclaim the space taken by the disk-based diagnostics routines after the completion of the factory tests.

One alternative to storing diagnostics software in the user's partition is to store the software in a system partition. The system partition needs to be small to minimize the usurpation of disk space from user applications. As prior diagnostics software required less than 20 megabytes, the system partition can be kept at a manageable size. However, with the advent of graphically orientated operating systems such as Windows 95, a partition with a minimum size of 25 megabytes or greater could be needed for diagnostic software during the manufacturing phase. Due to the size and the number of operating system files required to start the operating system and the size and number of files required to run modern diagnostic software, traditional provisions on the disk drive's system partition are insufficient to load the diagnostic software. However, the setup of a larger system partition would deprive the user of much needed disk drive space after diagnostics has been executing in the manufacturing phase. Thus, what is needed is an apparatus and a method for minimizing the amount of disk space ultimately lost to manufacturing diagnostics files.

SUMMARY OF THE INVENTION

An apparatus and a method for storing diagnostic software on a data storage device provides one or more ghost partitions overlapping a user partition on a data storage device. During a factory download of the application software as well as the diagnostics software, the apparatus creates a user partition and one or more overlapping ghost partitions. Next, it determines a minimum and maximum partition size for the ghost partition(s) and allocates the ghost partition size(s) appropriately. The apparatus then creates one or more master boot records (MBRs), one for each created partition. The ghost partition containing the diagnostics software is set as the active partition to allow the diagnostic software to be executed. Upon completion of the diagnostics process, the MBR for a second ghost partition is enabled so that upon reboot, download verification software located on a second ghost partition can be executed to ensure the correctness of the software downloading process.

Next, the ghost partitions are disabled to reclaim storage space back to the user partition and the MBR for the user partition is set as the active partition so that upon reboot, only user partitions are visible. Further, in the event that the diagnostics software needs to be executed for quality control purposes, the MBR containing data on the ghost partition with the diagnostics software replaces the MBR for the user partition so that the ghost partition with diagnostics software can be resurrected after it has been previously disabled. No master boot records for any of the user or system partitions are modified at any time during the process. Additionally, the MBR and file allocation table (FAT) for the ghost partition may be cleared so test data cannot be accessed after the factory test processes.

Since the ghost partitions overlap user partitions, after the ghost partitions have been disabled, data storage is automatically reclaimed by the user partitions when needed. The ghost partitions can properly function while overlapping the user partitions because while in the controlled environment of the factory, data will not be arbitrarily written to the user partition (otherwise both user and ghost partition data could become corrupt). Thus, the present invention avoids the need to set up a large system partition and avoids wasting disk space associated with manufacturing diagnostics.

BRIEF DESCRIPTION OF THE DRAWINGS

A better understanding of the present invention can be obtained when the following detailed description of the preferred embodiment is considered in conjunction with the following drawings, in which:

FIG. 4B is an illustration of a user partition, a ghost partition and a system partition within the data storage device of FIG. 1;

FIG. 5 is a flow chart of the process for allocating the size of the ghost partition;

DETAILED DESCRIPTION OF THE PREFERRED EMBODIMENT

A. Glossary of Terms

For ease of reference, terms as defined for use in describing the present invention are set forth below. As will be evident to those skilled in the art, the definitions incorporate both current standard meanings as well as extended meanings as prove necessary. They include the following:

Disabling: removing a ghost partition and restoring the space formerly occupied by the ghost partition back to the user partition. The disabling of the ghost partition still allows the possibility for resurrecting the ghost partition as subsequently needed;

Ghost Partition: a partition created during the manufacturing phase which is adapted to receive manufacturing diagnostics and other software. The ghost partition is not readily accessible by the user;

System Partition: a hidden partition storing configuration and related information and program accessible at boot-up by pressing a F10 key on certain computers such as those available from Compaq Computer Corporation;

User Partition: a partition on the data storage device which is adapted to receive applications visible to the user after boot-up.

B. The Computer with Ghost Partition(s)

Figure 1:
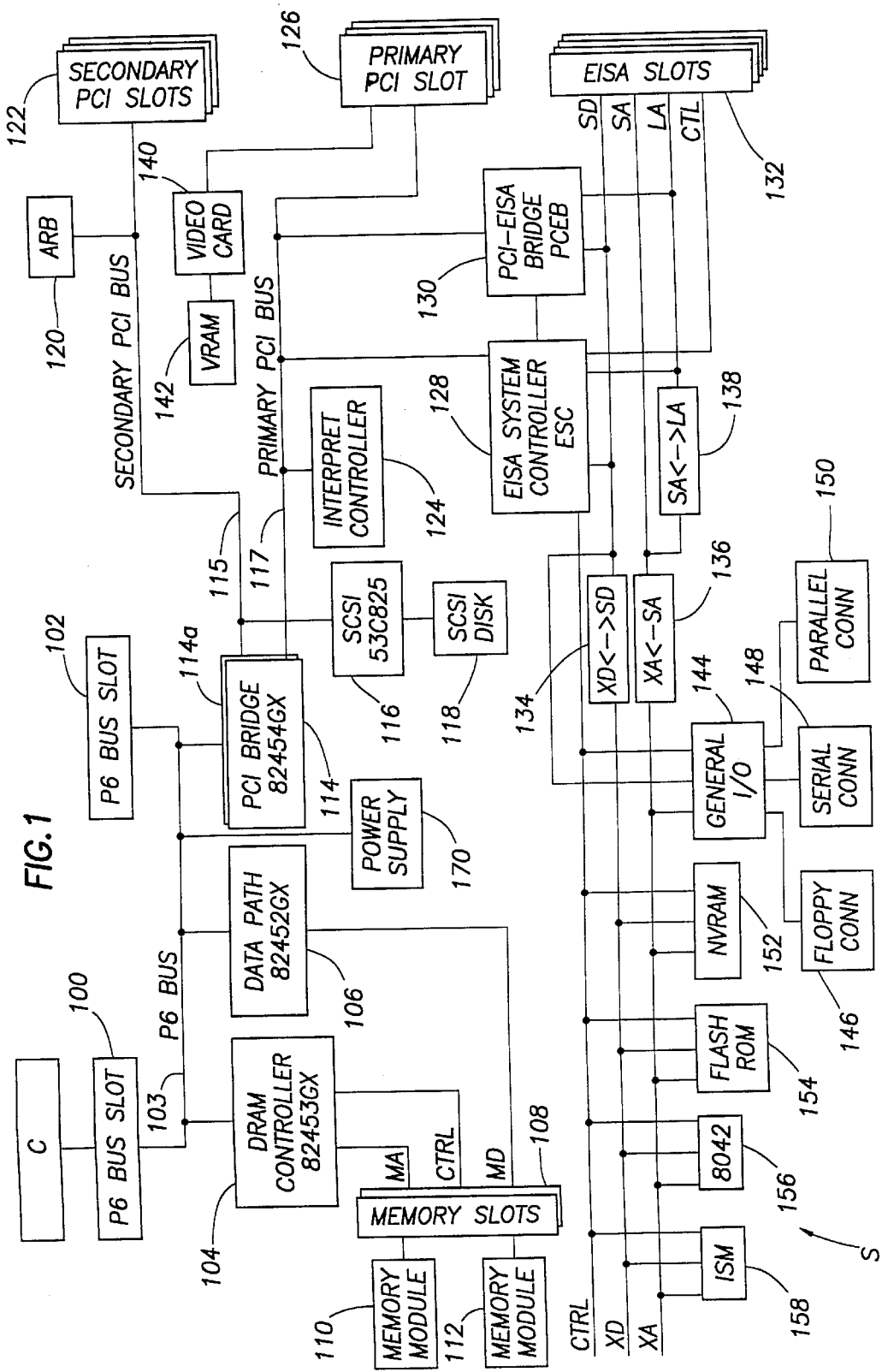
FIG. 1 is a schematic illustration of a computer system executing a Diagnostics for Windows software in accordance with the present invention.

Turning now to the drawings, a computer system S is disclosed in FIG. 1. The computer system S of FIG. 1 deploys one or more processors such as the Pentium Pro™ processor available from Intel Corporation located in Santa Clara, Calif. The Pentium Pro™ processors reside on a processor card C which is plugged into one of two P6 slots 100–102. The P6 slots 100–102 are connected to a 72-pin Pentium Pro™ host bus called the P6 bus 103. The P6 bus 103 is a high performance bus which can support two processor cards mounted on slots 100–102. Each processor card C supports two Pentium Pro™ processors.

In addition to the processors, the P6 bus 103 is connected to a memory controller 104 and a data path device 106 which collectively form a DRAM control subsystem. The illustrated DRAM controller is an 82453GX and the data path device 106 is an 82452GX, both of which are available from Intel Corporation.

The DRAM controller 104 provides control and timing to the memory subsystem, while the data path device 106 interfaces the 72-bit P6 host bus to the memory array. The memory controller 104 and the data path 106 are capable of taking a memory request from the CPU, queuing it, and responding after the requested operation has completed. Additionally, the controller 104 provides memory error correction which is vital in error-free applications, including the capability of single-bit error correction and multi-bit error detection on the fly. The memory controller 104 can handle up to four gigabytes of page mode DRAM. Memory arrangements having non-interleaved, x2 and x4 interleaving configurations are supported by the memory control sub-system.

A plurality of memory modules 110–112 are connected to memory slots 108 to provide up to four gigabytes of memory. These modules often have a standard width of 9 bits, with a relevant number of times 1 or times 4 chips, allocated to reach the indicated storage capacity, such as one megabyte, four megabytes or 16 megabytes. Thus, a 1M×9 module may comprise nine 1 Mb chips with the organization of 1 Mb×1, or two four-megabyte chips with the organization of 1 Mb×9 for data, as well as one megabit chip with the organization of 1 Mb×1 for parity information. The SIMM modules must be inserted into the intended sockets of the banks. Internally, the modules often combine pair by pair or four by four to realize a main memory with a data width of 16 or 32 bits. Thus, SIMM modules offer versatility in configuring the computer memory and are available in individual sizes from one megabyte to 64 megabytes per SIMM. Further, DIMMs or other memory technology can be used.

The CPU stores data and programs in the RAM. Accesses to the data and programs are accomplished by instructing the memory which data the CPU needs prior to sending the memory an address, akin to a "house number" of the data unit requested. The address information is provided from the CPU by an address bus, and the transfer of data from the RAM to the CPU is performed using a data bus. Generally, in computer terms, a bus means a number of lines through which related data and signals are transferred. The address bus consists of 32-bit address lines in the case of 386, 486 or Pentium processors. The data bus for these processors is also 32-bits in width. During operation, the actual performance of the memory subsystem will depend in part on the mix of read and write operations and the memory access patterns for a given application. The controller 104 minimizes the impact of the idle cycles by allowing read operations to bypass the write operations and be completed first as long as the memory addresses for the read/write pair do not match.

In addition to the memory controllers, a robust input/output system is needed for the computer system S. Two PCI buses 115 and 117 provide a combination of high performance and scalable I/O for the demanding environment faced in high performance applications. To provide PCI connections, one or more PCI bridges 114 are connected to the P6 bus 103. The peer-to-peer arrangement of the PCI buses eliminates one or more levels of arbitration present in the hierarchical arrangement, resulting in higher system performance.

As in the DRAM controller 104, the PCI bridge 114 supports a full 64-bit interface to the CPU bus, including support for all protocols as well as error correction. The PCI bridge 114 supports an 8-deep transaction in-order queue as well as separate 4-deep queues for both outbound (processor to PCI) and inbound (PCI to processor) transactions that are for the I/O bus agent. Also, like the DRAM controller 104, the PCI bridge 114 provides four 32-byte data buffers in both the inbound and outbound directions.

Attached to the secondary PCI bus 115 is a SCSI disk controller 116. The SCSI controller 116 provides the capability of handling simultaneous disk commands which is necessary in a multi-threaded, multi-tasking operating system. The illustrated SCSI controller 116 is a 53C825 available from NCR Corporation. Attached to the 53C825 is one or more SCSI data storage devices 118 which can support the host system's simultaneous issuance of multiple commands to one or more SCSI devices. In addition to the SCSI controller 116, a plurality of devices may be plugged into the secondary PCI bus 115 over a plurality of secondary PCI slots 122.

On the primary PCI bus 117, an interrupt controller 124 handles interrupt requests coming into the PCI bridge 114 for eventual transmission to one of the processors in slots 100–102. The interrupt controller 124 routes interrupt requests from devices located on PCI buses 115–117 to the processors on slots 100–102 during multiprocessor operation. Additionally, a number of PCI peripherals may be plugged into a plurality of primary PCI slots 126.

An EISA system controller (ESC) 128, preferably the Intel 82374EB device, and a PCI-EISA bridge (PCEB) 130, preferably the Intel 82375EB, are also connected to the primary PCI bus 117. The ESC 128 and the PCEB 130 work in tandem to provide an EISA I/O subsystem interface for the computer system S. The combination of the ESC 128 and the PCEB 130 provides an I/O subsystem capable of taking advantage of the power of the PCI bus architecture while maintaining access to a large base of EISA and ISA expansion cards, and the corresponding software applications.

The ESC 128 and the PCEB 130 are connected to a plurality of EISA slots 132. Additionally, the ESC 128 also generates chip selects for certain functions that typically reside on an X bus. The ESC 128 generates chip select signals from an integrated system management unit (ISM) 158, a keyboard controller 156, a flash ROM 154, a non-volatile RAM 152, and a general purpose I/O device 144 which supports floppy drives, serial ports, and parallel ports over floppy connectors 146, serial connectors 148, and parallel connectors 150.

A video controller 140 is connected to X bus address lines, the EISA/132 system data lines, and the latched address lines. The illustrated video controller is a Cirrus Logic 5424 controller. The video controller 140 is connected to a video RAM 142 which is 512 kilobytes in size. Turning now to hardware details on the video display system, video information is typically generated via the graphics adapter 140. In general, four main types of graphic adapters are commonly used in personal computers. The older graphics adapters include CGA for color graphics adapter which has a resolution of 300×200 four color screen or 640×200 two color screen. Yet another class of display called multicolor graphics array (MCGA) is available. The MCGA is essentially an analog superset of the CGA. Next in line in the evolution of display standard is an enhanced graphics adapter (EGA). The EGA adapter provides the 320×200 four color and the 600×200 two color modes of the CGA, in addition to the four EGA graphics mode. Currently, the graphics standard in personal computing is called video graphics array (VGA). The VGA adapter provides all modes of EGA, CGA and MCGA graphics, as well as one additional graphics modes: a 640×480 sixteen color mode.

Given the complexity of the computer system S, it is possible for the computer system S to experience problems associated with any one of its major components, such as the hard drive, the display, the memory, and the CPU. It becomes increasingly important, therefore, to provide a diagnostic capability for the computer system S for testing at the factory before the computer system S leaves the factory.

Figure 2:
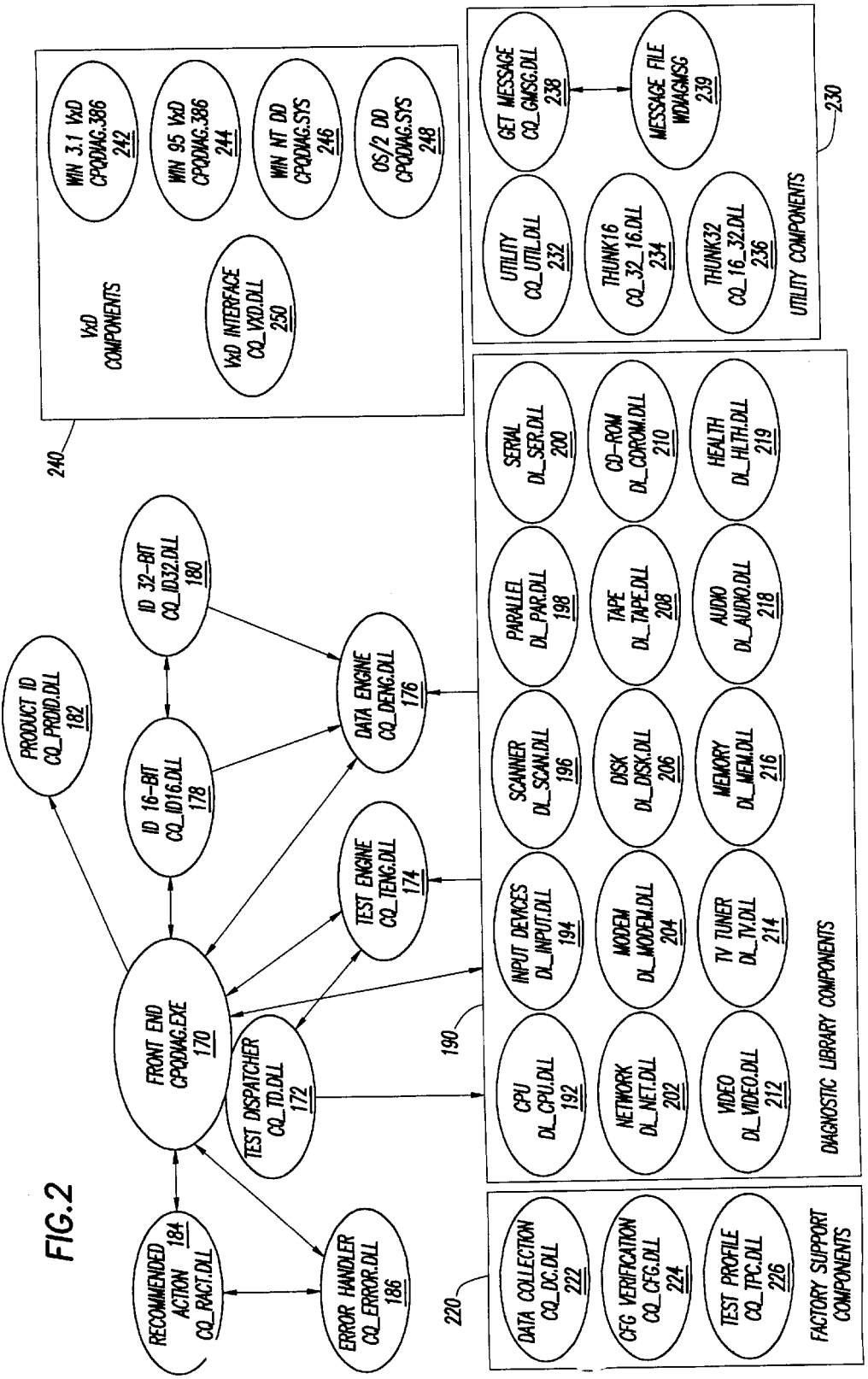
FIG. 2 is a diagram illustrating in more detail components of the Diagnostics for Windows software in accordance with the present invention.

Turning now to FIG. 2, the interaction between the various modules of the Diagnostics for Windows (DFW) architecture is shown. The high level operation of this software is further described in the previously incorporated copending United States patent application having Ser. No. 08/774,808, entitled "MULTI-TASKABLE DIAGNOSTICS MODULE." As it pertains to the present invention, it is important to note that these diagnostics typically require over twenty five megabytes of disk space. In FIG. 2, a front end module 170 is provided as a main program and user interface. The front end module 170 initializes the DFW and verifies that all of the DLLs are valid. Furthermore, the front end 170 is responsible for all user interactions and interface functionalities, The front end 170 communicates with a test dispatcher 172. The test dispatcher 172 is responsible for dispatching diagnostic tests, managing test threads, and other aspects relating to the management of the system tests. The front end 170 and the test dispatcher 172 further communicate with a test engine 174 which is a depository of all diagnostic test information. The test engine 174 determines which tests are valid, as gathered from various diagnostic libraries (DLs 190). The front end 170 uses the depository in the test engine 174 to determine which diagnostics test to run.

The front end 170 also communicates with a data engine 176. The data engine 176 is a depository for all system inspection information as gathered by the product identification and the diagnostic libraries. The front end 170 uses the depository in the data engine 176 to report inspection information to the user. Additionally, the front end 170 also communicates with a 16-bit ID module 178 which in turn drives the data engine 176. The 16-bit ID unit 178 inspects relevant hardware/firmware/software information in the computer, and is responsible for gathering all of the information relating to 16-bit peripheral type. The 16-bit ID module 178 in turn communicates with a 32-bit ID module 180. The 32-bit ID module 180 further communicates with the data engine 176 for reporting relevant hardware/firmware/software information not gathered by the 16-bit ID module 178.

The front end module 170 also communicates with a product ID module 182 which identifies the product currently being tested. The product ID module 182 also sets the product name and processor speed and initializes the internal tables and variables for the DFW program. Additionally, the front end 170 communicates with a recommended action module 184, which is a simplified expert system to display to the user recommended choices for recovering from errors reported during testing. The recommended module 184 and the front end module 170 also communicate with an error handler 186, which is a depository of all error information. The error handler 186 is responsible for reporting errors to the user including both the error code and the recommended actions, as provided by the recommended action module 184. The Diagnostics for Windows architecture further provides a plurality of diagnostic library components 192–219. A factory support components 220 is also provided generally for manufacturing and assembly related processes. A data collection module 222 is provided to provided to report test information such as pass or fail, and error code, among others in the factory testing process. The data collection module 222 comprehends the network and database schemes in the factory for recording this information. Additionally, a configuration verification module 224 is provided for verifying that the system has been built according to the bill of material (BOM). Thus, the configuration verification module 224 verifies that the computer under test has the correct hardware, software and firmware as needed. Furthermore, the factory support component 220 has a test profile configuration module 226 which is responsible for reading the test profile configuration file produced by the test definition tool (TDT) and converting the configuration file into a form usable by the test dispatcher 172. Additionally the Diagnostic for Windows software contains a plurality of VxD components 240 with a VxD interface module 250. The VxD interface module 250 interfaces to the operating systems specific device driver.

The front end 170 is also responsible for displaying inspection information, interacting with a user, loading and initializing the diagnostic library components, allowing selection and specification of diagnostic tests, launching and monitoring diagnostic tests, displaying test status, and displaying all errors and recommended actions to the user. In turn, the diagnostic 190 are responsible for identifying all hardware devices, specifying valid tests for hardware devices, relaying all information needed by the front end 170 to display and allow selection of diagnostic tests, executing diagnostic tests and relaying the test status and errors to the front end module 170.

All of the inspection information in the diagnostic for Windows software is gathered upon the execution of the Diagnostics for Windows and stored in a data engine 176. The front end module 170 uses the inspect engine 176 to display information to the user during the execution of the diagnostics. The inspect engine thus resides in the data engine 176 and contains information needed by the front end module 170. All of the diagnostic test information for Diagnostics for Windows is gathered upon the execution of diagnostics and stored in the test engine 174. The front end module 170 uses the test engine 174 to display hardware devices and associated diagnostic tests to the user during that execution of diagnostics. The test engine 174 contains information that the front end module 170 needs to display the hardware devices and associated diagnostics to the user.

The test dispatcher 172 is responsible for scanning the lists of tests to be run and calling the individual diagnostic library components 190 to dispatch the diagnostic tests. The test dispatcher 172 is responsible for controlling a number of active threads as well as monitoring and reporting the status of the diagnostics tests.

The error handler 186 is responsible for logging and reporting all errors when a diagnostic test fails. Thus, it is the responsibility of the components of the diagnostic library 190 to relay all error information to the error handler 186. The error handler 186 contains information that the front end module 170 needs for reporting the error and determining a recommended action from the recommended action module 184. The recommended action module 184 holds several possible recommendation for each possible error. The handier 184 will interact with a small engine for field tests and use the network to access more complete information in factory tests.

As discussed above, the software for diagnosing the computer system S of the present invention is quite complex and can take over twenty-five megabytes of disk space. Thus, it is desirable that the software for testing the computer system S be removed and reinstated as easily as possible afterwards. The present invention provides a ghost partition which supports such ease of storing and removing test software, as discussed below.

Figure 3:
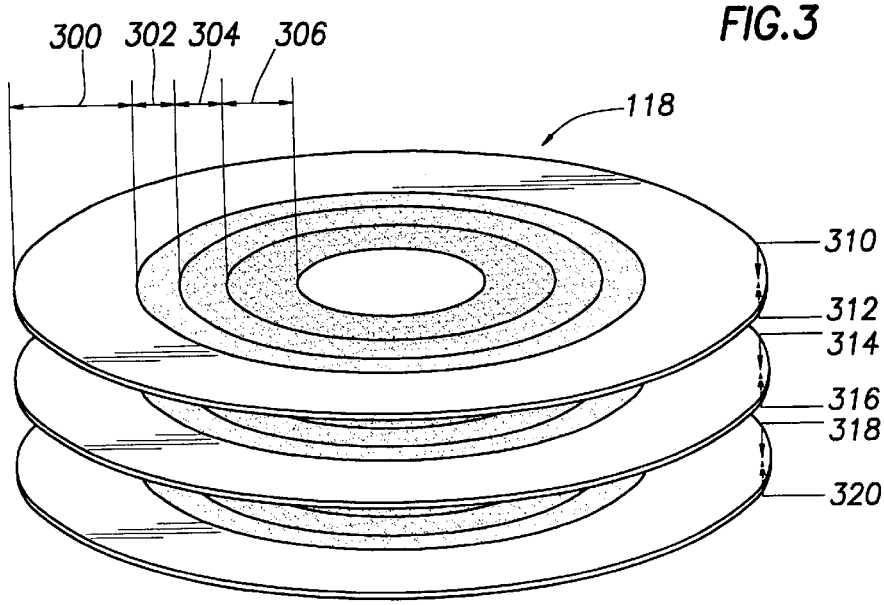
FIG. 3 is an illustration of partitions within a multiplatter disk drive.

FIG. 3 illustrates in detail the organization of data storage tracks on the data storage device 118 for flexibly storing and removing large diagnostics packages such as the Diagnostics for Windows software. In the computer system S, the hard disk 118 is typically divided into partitions which generally start and end at cylinder boundaries. For storing the partition information, a unique location which is definitely present on every hard disk is chosen as the first sector for head 0 and track 0. This is a first physical sector of the hard disk. This first physical sector, or a partition sector, contains information about individual partitions by means of partition entries in a partition table. In the IBM personal computer, the partition table is 64 bytes long and can accommodate four partitions at most, held in an inverse order. Besides the partition table, the partition sector contains a small program as well as a two-byte signature 0xAA55. Upon power-up of the IBM PC, the BIOS calls the partition sector program which checks the internal consistency of entries in the partition table and then boot loads the boot strap loader from the boot sector. If the partition table is damaged or inconsistent, the program issues an error message and terminates the load process.

In the IBM PC, the partition table holds entries for a maximum of four partitions. They specify the physical start and end sector of each partition in a compressed three byte format. If several operating systems reside in separate partitions on the disk, then the IBM PC must be able to determine which of the various systems is to be loaded. To resolve this issue, a boot indicator is provided. Thus, in the IBM PC an entry 80h indicates a bootable active partition, and entry 0h indicates a non-bootable (inactive) partition. The program at the beginning of the partition sector determines during the boot phase where the bootable partition is located, and then actively loads the routine to boot the system.

Referring back to FIG. 3, the hard disk 118 has three platters, each with two sides. Thus, the hard drive 118 of FIG. 3 can be accessed by six heads in total: head 0 310 on the upper surface of the first platter and head 1 312 on the bottom side of the first platter, head 2 314 on the top side of the second platter and head 2 316 on the bottom side of the second platter, head 4 318 on the top side of the third platter and head 5 320 on the bottom side of the third platter of the hard drive 118 of FIG. 3. The heads 310–320 can move over the surfaces of the platters and retrieve information as necessary. Further, as shown in FIG. 3, the hard drive 118 has a first physical partition 300, a second physical partition 302, a third physical partition 304 and a fourth physical partition 306. The partition table would then be set up to point to the following physical partitions as follows:

First Partition 300: System Partition

Second Partition 302: Users Primary Boot Partition

Third Partition 304: Extended Partition

Fourth Partition 306: Extended Partition

In the event that the data storage device has 2 gigabyte or more capacity, the first partition 300 is a big file allocation table (FAT) type for supporting a larger capacity partition, while the third partition 304 is a 12 or 16 bit FAT, depending on the size required. In the disclosed embodiment, the fourth partition 306 is not used.

Figure 4A:
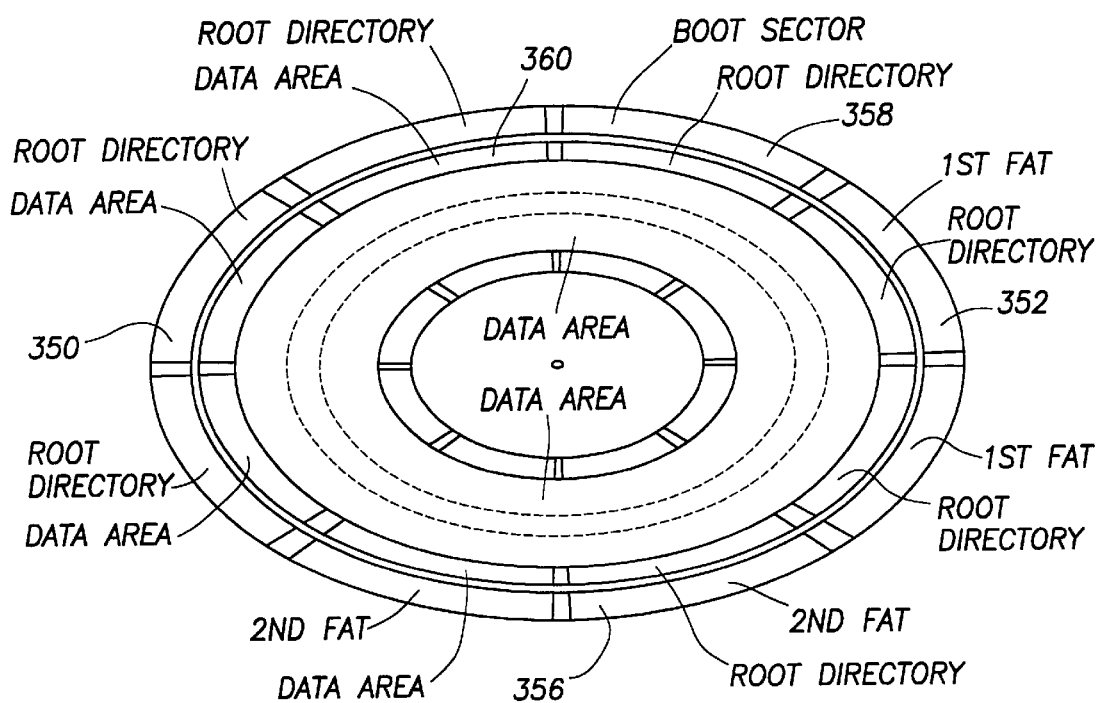
FIG. 4A is an illustration of regions within a partition of the disk drive of FIG. 3.

Referring now to FIG. 4A, the boot portion of a partition of the hard drive 118 is illustrated in more detail. As shown in FIG. 4A, the portion containing the boot information has a plurality of root directories 350, a plurality of first file allocation tables (FATS) 352, a plurality of second FATs 356 and a boot sector 358.

The boot sector of every floppy or every hard drive partition contains the program for loading the disk operating system, regardless of whether the floppy or partition is bootable or not. Only the loaded program in the boot sector determines whether the required system data is actually present on the disk or in the partition. During boot from a floppy disk, the loaded program in the boot sector 358 checks whether system files are present, indicating that the appropriate OS is present on the disk. If the loaded program finds the required system files, then these files and the operating system are loaded into the main memory. Alternatively, in the event that the system is booting from the active partition of the hard drive 118, the BIOS start routine branches through the program at offset 0H in the partition sector. The program then investigates the partition table, determines the bootable partition and branches to the bootable partition to complete.

The various partitions, root directory, FATS, and boot sector of the hard drive 118 are set up during a software install process called a software download (or surrogate) process. The surrogate process first sets up the user partition 300. It then invokes the process of FIG. 5 for determining the appropriate ghost partition size and setting of the appropriate ghost partition. This action results in a ghost partition 364 of FIG. 4B. As shown in FIG. 4B, a user partition 362 overlaps with the ghost partition 364. As is apparent, if the user partition 362 were to be filled with data, that data would corrupt the data in the ghost partition 364. Because of the controlled factory environment, however, appropriate precautions can be taken to assure that such events will not happen.

Additionally, a system partition 366 borders with the user partition 362. The system partition 366 allows the system set-up software to be stored for system configuration purposes immediately upon boot-up. The system set-up software is invocable upon boot up by pressing a F10 key. Although extended user partitions are not shown, the present invention contemplates that primary and extended user partitions can co-exist. Further, the present invention contemplates that computer systems which do not offer the system partition 366 can still utilize the advantages of the invention disclosed herein.

Continuing with the download process, the surrogate process next copies appropriate files to the data storage device 118, which at this point is connected to a factory computer network rather than the computer of FIG. 1. In this process, a central source or copy system running on the network downloads all user software as well as diagnostics software onto the data storage device 118. Once the data storage device 118 has been properly set up and appropriate data and software transferred to the data storage device 118, the data storage device 118 is installed into the computer system of FIG. 1 before it is tested using the processes of FIGS. 6–8.

Preferably, the present invention stores four master boot records (MBRs), each of which is used in a different phase for the computer under test. The four phases include a test phase where diagnostics routines are executed from the ghost partition; a software verification phase where a routine is executed to verify the integrity of the downloaded software using suitable error checking code such as cyclic redundancy code (CRC) or a CRC like code such as a MD5 code; a user phase where only user partitions (such as a C: drive and/or a D: drive, among others) are visible; and a statistical sampling phase where the ghost partition is restored to its configuration and diagnostics software made available for further testing of the computer under test in accordance with quality control procedures. The following table illustrates the partitions, as well as the contents of each of the four MBR designations:

| Partition | MBR 1 Test Phase | MBR 2 Software Verification Phase | MBR 3 User Phase | MBR 4 Statistical Sampling Phase (same as Test Phase) |
|---|---|---|---|---|
| 1 | D: Primary | D: Primary | C: Primary | D: Primary |
| 2 | C: Diagnostics | C: Software Verification | — | C: Diagnostics |
| 3 | E: System | E: System | — | E: System |
| 4 | — | — | — | — |

In the preferred embodiment, each of the MBR designations contains a partition table, each of which stores data relating to the four partitions to be specified. The MBR partition tables preferably reside on the first four sectors of the data storage device, with the first physical sector containing MBR 1 as the partition sector addressed on system boot. As the title of the table indicates, MBR 1 is associated with the test phase, while MBR 2 is associated with the software verification phase, MBR 3 is associated with the user phase, while MBR 4 is associated with the statistical sampling phase (being the same partition table as used in the test phase).

The surrogate computer sets up partitions, downloads software to the partitions, and sets up the MBRs. Further, at the end of the download process, the diagnostics partition (partition 2) for the first MBR is the active (boot) partition. At this stage, diagnostics software is available on drive C: after boot-up. It is to be noted that although diagnostics software is shown in the preferred embodiment, the present invention is not limited to diagnostics software. Thus, a variety of software can be installed on the first ghost partition.

Once the tests are completed, the present invention moves to the next stage where it verifies the integrity of the downloaded software. This is performed by copying MBR 2 over MBR 1. Thus, the partition sector then holds a copy of the contents of MBR 2. Further, to provide more security, after the contents of MBR 2 has been copied to MBR 1, the content of MBR 2 may be cleared so that the software verification software and history information become inaccessible to the user. After the copying of MBR 2 to MBR 1, the computer is rebooted. Upon boot-up, the integrity verification software becomes visible as software in drive C:. Once the integrity verification software becomes visible, it can be executed. It is to be further noted that although download verification software is shown in the second ghost partition, the present invention is not limited to verification software. Thus, a variety of software can be installed on the second ghost partition.

Upon the completion of the integrity verification, the system of the present invention copies MBR 3 over MBR 1 to set up the computer for the user prior to shipping. Particularly, after MBR 1 receives the content of MBR 3, only the user partition C: or D:, among others, is visible upon boot-up. The system partition E: is not visible to the user on a normal boot-up, but is accessible when the user presses an F10 key during power-on or executes a set-up diskette during power-on.

On occasions, the diagnostics software needs to be resurrected after the computer system has been prepared for shipping, i.e., after MBR 3 has been copied over MBR 1. These events may be required by a quality control process which randomly samples the computer products and requires the suite of diagnostics to be run to verify the quality of the production. In this case, MBR 4 is copied over MBR 1 to restore the ghost partition and the diagnostics software suite on the ghost partition. After MBR 1 has been updated to point to the ghost partition, the computer system is rebooted and the diagnostics software becomes visible in drive C:. Upon the completion of the statistical sampling process, MBR 3 is copied over MBR 1 to once more set up the computer for the user prior to shipping.

The MBR copying or moving process is illustrated in more detail in the following example. It is to be noted that specific cylinder and sector characteristics of the data storage device 118 is provided as exemplary values only and is not intended to limit the scope of the present invention to any specific data storage device. Referring now to the example below, as usual, when the computer under test is about to undergo testing, the surrogate computer copies user application software as well as test software into the disk drive. At this stage, before the ghost partition allocation processes, for an illustrative data storage device 118 with 525 cylinders and 63 sectors, the layout for the first four physical sectors of the data storage device 118 is as follows:

| System | Boot | Starting Location | | | Ending Location | | |
|---|---|---|---|---|---|---|---|
| | | Side | Cylinder | Sector | Side | Cylinder | Sector |
| Physical Sector 1: | | | | | | | |
| BIGDOS | Yes | 0 | 2 | 1 | 63 | 525 | 63 |
| ? | No | 0 | 0 | 0 | 0 | 0 | 0 |
| FAT_12 | No | 1 | 0 | 1 | 63 | 1 | 63 |
| ? | No | 0 | 0 | 0 | 0 | 0 | 0 |
| Physical Sector 2: | | | | | | | |
| ? | No | 0 | 0 | 0 | 0 | 0 | 0 |
| ? | No | 0 | 0 | 0 | 0 | 0 | 0 |
| ? | No | 0 | 0 | 0 | 0 | 0 | 0 |
| ? | No | 0 | 0 | 0 | 0 | 0 | 0 |
| Physical Sector 3: | | | | | | | |
| ? | No | 0 | 0 | 0 | 0 | 0 | 0 |
| ? | No | 0 | 0 | 0 | 0 | 0 | 0 |
| ? | No | 0 | 0 | 0 | 0 | 0 | 0 |
| ? | No | 0 | 0 | 0 | 0 | 0 | 0 |
| Physical Sector 4: | | | | | | | |
| ? | No | 0 | 0 | 0 | 0 | 0 | 0 |
| ? | No | 0 | 0 | 0 | 0 | 0 | 0 |
| ? | No | 0 | 0 | 0 | 0 | 0 | 0 |
| ? | No | 0 | 0 | 0 | 0 | 0 | 0 |

Thus, at the beginning, only the partition table for MBR 1 is defined, while the partition tables associated with the remaining MBRs are undefined. Further, according to MBR 1, the first partition containing BIG_DOS is bootable. At this stage, the beginning and ending sector(s) for the ghost partition(s) must be calculated. These sector ranges will overlap the primary user partition, presently the first partition pointed to by the first MBR illustrated above. This is done by the routine discussed below in conjunction with FIG. 5.

Once the respective size(s) of the ghost partition(s) has been computed, appropriate alternative partition tables are stored to the physical sectors of the data storage device as shown below:

| System | Boot | Starting Location | | | Ending Location | | |
|---|---|---|---|---|---|---|---|
| | | Side | Cylinder | Sector | Side | Cylinder | Sector |
| Physical Sector 1: | | | | | | | |
| BIGDOS | No | 0 | 2 | 1 | 63 | 525 | 63 |
| BIGDOS | Yes | 0 | 450 | 1 | 63 | 525 | 63 |
| FAT_12 | No | 1 | 0 | 1 | 63 | 1 | 63 |
| ? | No | 0 | 0 | 0 | 0 | 0 | 0 |
| Physical Sector 2: | | | | | | | |
| BIGDOS | No | 0 | 2 | 1 | 63 | 525 | 63 |
| BIGDOS | Yes | 0 | 350 | 1 | 63 | 449 | 63 |
| FAT_12 | No | 1 | 0 | 1 | 63 | 1 | 63 |
| ? | No | 0 | 0 | 0 | 0 | 0 | 0 |
| Physical Sector 3: | | | | | | | |
| BIGDOS | Yes | 0 | 2 | 1 | 63 | 525 | 63 |
| ? | No | 0 | 0 | 0 | 0 | 0 | 0 |
| FAT_12 | No | 1 | 0 | 1 | 63 | 1 | 63 |
| ? | No | 0 | 0 | 0 | 0 | 0 | 0 |
| Physical Sector 4: | | | | | | | |
| BIGDOS | No | 0 | 2 | 1 | 63 | 525 | 63 |
| BIGDOS | Yes | 0 | 450 | 1 | 63 | 525 | 63 |

-continued

|  |  | Starting Location | | | Ending Location | | Sec- |
| System | Boot | Side | Cylinder | Sector | Side | Cylinder | tor |
| --- | --- | --- | --- | --- | --- | --- | --- |
| FAT_12 | No | 1 | 0 | 1 | 63 | 1 | 63 |
| ? | No | 0 | 0 | 0 | 0 | 0 | 0 |

At this stage, it is seen that the partition sector is set to boot from a first ghost partition spanning from cylinders 450 to 525, which overlaps the primary user partition spanning cylinders 2 to 525. Further, a copy of this partition table (the "software diagnostics" table) is stored in Sector 4. Sector 3 has a partition table suitable for the end user, with the enabled primary user partition spanning from cylinder 2 to 525 while the system diagnostics partition (accesible by pressing F10 at boot) is found on cylinders 0 to 1. Note that no ghost partitions are specified. The second sector includes a ghost partition as the second partition table entry spanning cylinders 350–449 (again, overlapping the primary user partition). The ghost partition in this sector is for software verification purposes.

Figure 6:
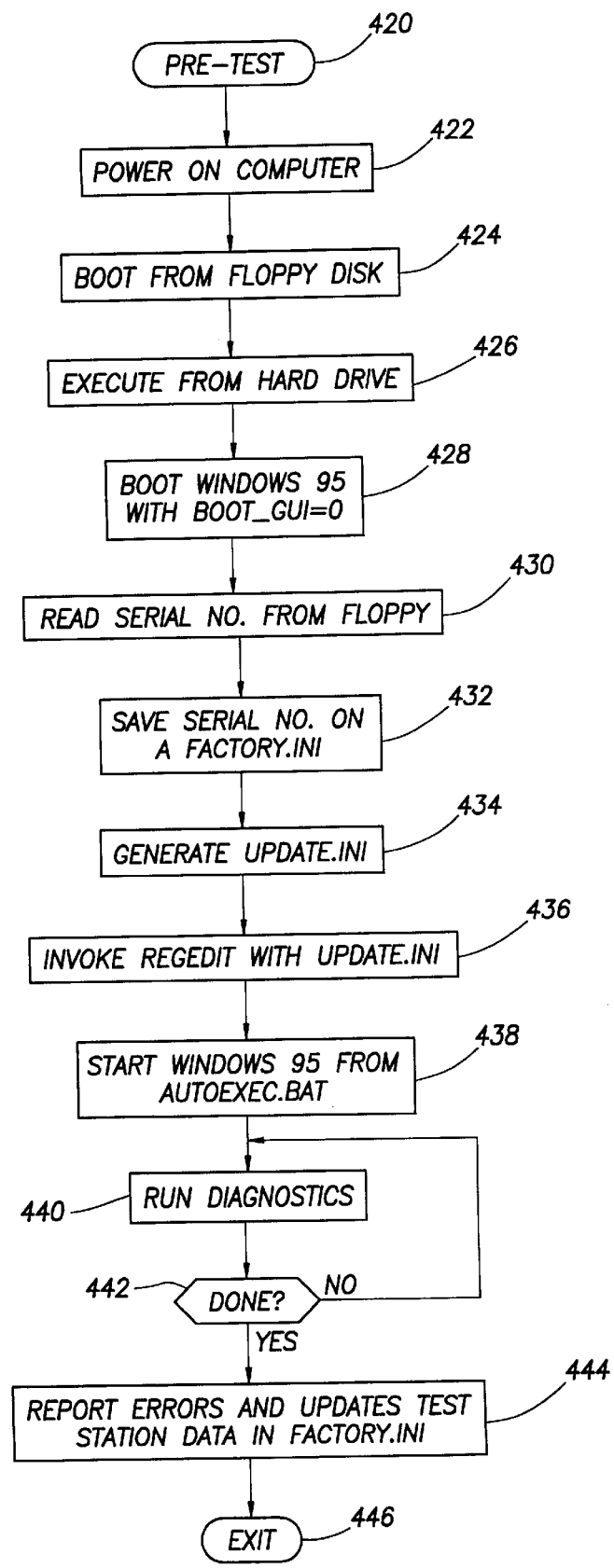
FIG. 6 is a flow chart illustrating the process in a pre-test station for performing interactive tests with the machine and the tests.

With these partition tables in place, once the computer system of FIG. 1 is powered up, it can execute the test process of FIG. 6. As the first ghost partition is configured to be the active partition, the computer system of FIG. 1 boots up using the ghost partition such that the computer system of FIG. 1 is ready to run factory diagnostics.

Once the factory diagnostics tests are successfully executed, the present invention moves to the next stage where it verifies the integrity of the downloaded software. This is performed by copying MBR 2 over MBR 1. Further, to provide more security, after the content of MBR 2 has been copied to MBR 1, MBR 2 can be cleared so that the software verification software and history information are inaccessible to the user. After the copying of MBR 2 to MBR 1, the computer is reset. Upon boot-up, the integrity verification software becomes visible as software in drive C. Once the integrity verification software becomes visible, they can be executed. Thus, after MBR 2 has been copied over MBR 1, the sector layout becomes as follows:

|  |  | Starting Location | | | Ending Location | | Sec- |
| System | Boot | Side | Cylinder | Sector | Side | Cylinder | tor |
| --- | --- | --- | --- | --- | --- | --- | --- |
| Physical Sector 1: | | | | | | | |
| BIGDOS | No | 0 | 2 | 1 | 63 | 525 | 63 |
| BIGDOS | Yes | 0 | 350 | 1 | 63 | 449 | 63 |
| FAT_12 | No | 1 | 0 | 1 | 63 | 1 | 63 |
| ? | No | 0 | 0 | 0 | 0 | 0 | 0 |
| Physical Sector 2: | | | | | | | |
| BIGDOS | No | 0 | 2 | 1 | 63 | 525 | 63 |
| BIGDOS | Yes | 0 | 350 | 1 | 63 | 449 | 63 |
| FAT_12 | No | 1 | 0 | 1 | 63 | 1 | 63 |
| ? | No | 0 | 0 | 0 | 0 | 0 | 0 |
| Physical Sector 3: | | | | | | | |
| BIGDOS | Yes | 0 | 2 | 1 | 63 | 525 | 63 |
| ? | No | 0 | 0 | 0 | 0 | 0 | 0 |
| FAT_12 | No | 1 | 0 | 1 | 63 | 1 | 63 |
| ? | No | 0 | 0 | 0 | 0 | 0 | 0 |
| Physical Sector 4: | | | | | | | |
| BIGDOS | No | 0 | 2 | 1 | 63 | 525 | 63 |
| BIGDOS | Yes | 0 | 450 | 1 | 63 | 525 | 63 |
| FAT_12 | No | 1 | 0 | 1 | 63 | 1 | 63 |
| ? | No | 0 | 0 | 0 | 0 | 0 | 0 |

Upon the completion of the integrity verification, the present invention copies MBR 3 over MBR 1 to set up the computer for the user prior to shipping. Particularly, after MBR 1 receives the content of MBR 3, only the user partition C: or D:, among others, is visible upon boot-up. The system partition E: is not visible to the user on a normal boot-up, but is accessible when the user presses an F10 key during power-on or executes a set-up diskette during power-on. Thus, the sector layout becomes:

|  |  | Starting Location | | | Ending Location | | Sec- |
| System | Boot | Side | Cylinder | Sector | Side | Cylinder | tor |
| --- | --- | --- | --- | --- | --- | --- | --- |
| Physical Sector 1: | | | | | | | |
| BIGDOS | Yes | 0 | 2 | 1 | 63 | 525 | 63 |
| ? | No | 0 | 0 | 0 | 0 | 0 | 0 |
| FAT_12 | No | 1 | 0 | 1 | 63 | 1 | 63 |
| ? | No | 0 | 0 | 0 | 0 | 0 | 0 |
| Physical Sector 2: | | | | | | | |
| BIGDOS | No | 0 | 2 | 1 | 63 | 525 | 63 |
| BIGDOS | Yes | 0 | 350 | 1 | 63 | 449 | 63 |
| FAT_12 | No | 1 | 0 | 1 | 63 | 1 | 63 |
| ? | No | 0 | 0 | 0 | 0 | 0 | 0 |
| Physical Sector 3: | | | | | | | |
| BIGDOS | Yes | 0 | 2 | 1 | 63 | 525 | 63 |
| ? | No | 0 | 0 | 0 | 0 | 0 | 0 |
| FAT_12 | No | 1 | 0 | 1 | 63 | 1 | 63 |
| ? | No | 0 | 0 | 0 | 0 | 0 | 0 |
| Physical Sector 4: | | | | | | | |
| BIGDOS | No | 0 | 2 | 1 | 63 | 525 | 63 |
| BIGDOS | Yes | 0 | 450 | 1 | 63 | 525 | 63 |
| FAT_12 | No | 1 | 0 | 1 | 63 | 1 | 63 |
| ? | No | 0 | 0 | 0 | 0 | 0 | 0 |

On occasions, the diagnostics software need to be resurrected after the computer system has been prepared for shipping, i.e., after MBR 3 has been copied over MBR 1. These events may be required by a quality control process which randomly samples the computer products and cause the suite of diagnostics to be run to verify the quality of the production. In this case, MBR 4 is copied over MBR 1 to restore the ghost partition and the diagnostics software suite on the ghost partition. After MBR 1 has been updated to point to the ghost partition, the computer system is rebooted and the diagnostics software becomes visible in drive C:. The simulated partition layout after the copying of MBR 4 over MBR 1 is illustrated below:

| | | Starting Location | | | Ending Location | | |
|---|---|---|---|---|---|---|---|
| System | Boot | Side | Cylinder | Sector | Side | Cylinder | Sector |
| Physical Sector 1: | | | | | | | |
| BIGDOS | No | 0 | 2 | 1 | 63 | 525 | 63 |
| BIGDOS | Yes | 0 | 450 | 1 | 63 | 525 | 63 |
| FAT_12 | No | 1 | 0 | 1 | 63 | 1 | 63 |
| ? | No | 0 | 0 | 0 | 0 | 0 | 0 |
| Physical Sector 2: | | | | | | | |
| BIGDOS | No | 0 | 2 | 1 | 63 | 525 | 63 |
| BIGDOS | Yes | 0 | 350 | 1 | 63 | 449 | 63 |
| FAT_12 | No | 1 | 0 | 1 | 63 | 1 | 63 |
| ? | No | 0 | 0 | 0 | 0 | 0 | 0 |
| Physical Sector 3: | | | | | | | |
| BIGDOS | Yes | 0 | 2 | 1 | 63 | 525 | 63 |
| ? | No | 0 | 0 | 0 | 0 | 0 | 0 |
| FAT_12 | No | 1 | 0 | 1 | 63 | 1 | 63 |
| ? | No | 0 | 0 | 0 | 0 | 0 | 0 |
| Physical Sector 4: | | | | | | | |
| BIGDOS | No | 0 | 2 | 1 | 63 | 525 | 63 |
| BIGDOS | Yes | 0 | 450 | 1 | 63 | 525 | 63 |
| FAT_12 | No | 1 | 0 | 1 | 63 | 1 | 63 |
| ? | No | 0 | 0 | 0 | 0 | 0 | 0 |

Upon the completion of the statistical sampling process, MBR 3 is copied over MBR 1 to once more set up the computer for the user prior to shipping. As discussed earlier, after MBR 1 receives the content of MBR 3, only the user partition C: or D:, among others, is visible upon boot-up. The system partition E: is not visible to the user on a normal boot-up, but is accessible when the user presses an F10 key during power-on or executes a set-up diskette during power-on. Thus, in accordance with the present invention, after manufacturing diagnostics have been executed and the ghost partition "disabled", the sectors are mapped as follows:

| | | Starting Location | | | Ending Location | | |
|---|---|---|---|---|---|---|---|
| System | Boot | Side | Cylinder | Sector | Side | Cylinder | Sector |
| Physical Sector 1: | | | | | | | |
| BIGDOS | Yes | 0 | 2 | 1 | 63 | 525 | 63 |
| ? | No | 0 | 0 | 0 | 0 | 0 | 0 |
| FAT_12 | No | 1 | 0 | 1 | 63 | 1 | 63 |
| ? | No | 0 | 0 | 0 | 0 | 0 | 0 |
| Physical Sector 2: | | | | | | | |
| BIGDOS | No | 0 | 2 | 1 | 63 | 525 | 63 |
| BIGDOS | Yes | 0 | 350 | 1 | 63 | 449 | 63 |
| FAT_12 | No | 1 | 0 | 1 | 63 | 1 | 63 |
| ? | No | 0 | 0 | 0 | 0 | 0 | 0 |
| Physical Sector 3: | | | | | | | |
| BIGDOS | Yes | 0 | 2 | 1 | 63 | 525 | 63 |
| ? | No | 0 | 0 | 0 | 0 | 0 | 0 |
| FAT_12 | No | 1 | 0 | 1 | 63 | 1 | 63 |
| ? | No | 0 | 0 | 0 | 0 | 0 | 0 |
| Physical Sector 4: | | | | | | | |
| BIGDOS | No | 0 | 2 | 1 | 63 | 525 | 63 |
| BIGDOS | Yes | 0 | 450 | 1 | 63 | 525 | 63 |
| FAT_12 | No | 1 | 0 | 1 | 63 | 1 | 63 |
| ? | No | 0 | 0 | 0 | 0 | 0 | 0 |

In this manner, when the user receives the computer, he or she only observes the partition with the user partition C: or D: Turning now to FIG. 5, the process for allocating the space of the ghost partition is illustrated in more detail. In FIG. 5, from the entry step 370, the routine of FIG. 5 checks on the last sector with data written to it in step 372. From step 372, the routine proceeds to step 374 where it saves sector 0 of the hard drive 118 to a second sector. From step 374, the routine proceeds to step 376 where it reads the minimum and maximum partition size available from a file (DIAG.MAP) or an equivalent database which contains the following information: MODL, DIRPATH1, OPTIONALDIRPATH2, BOOTFILEPATH, OPTIONALBOOTFILEPATH2, MINPARTSIZE, and OPTIONALMAXPARTSIZE.

MODL relates the model number of the computer being tested and are used as a cross reference to find the product line among all the other model number possibilities. Next comes the primary directory path DIRPATH1 to find the diagnostics. A secondary directory path can also be optionally provided after DIRPATH1. These two directory specifications can be used in combination to specify how the finished partition should be installed. An example of a use of these two directories might be a 'common' directory and a 'specific to model number' directory. This allows more intelligent version management by having a common core of files (WIN95 for example) and some specific files (the diagnostics themselves and separated in directories by machine type). Although hierarchical directory file organization is preferred, the present invention contemplates all files may be stored in one directory for each model.

The BOOTFILEPATH field specifies the name and path on the factory server where the specific boot file necessary for the manufacturing diagnostics ghost partition can be found. There will most likely be only two boot files for all versions: WIN95 or NT. If a particular installation of DIAGS calls for both WIN95 and NT to live in the same partition, the boot sector specified recites the operating system which will be booted first. After that, the manufacturing diagnostic software's responsibility replaces the master boot record to designate the second operating system which must be booted.

To facilitate dual-boot systems (especially Windows NT), an OPTIONALBOOTFILEPATH2 field can be provided. If this is specified, the designated boot file will be read and treated as a normal boot sector. However this will not be written to the boot sector of the partition but will instead be written back to the drive to allow dual-boot functionality to work. Next is the mandatory MINPARTSIZE or minimum partition size for this particular diagnostic/model. If this value cannot be obtained by the surrogate loader from the last valid partition on the drive, an exception error would be generated.

OPTIONALMAXPARTSIZE can be given to specify a partition size that would be the optimum to obtain for the manufacturing diags. If it is not specified, a comma after MINPARTSIZE should be given to indicate a blank value. If it is specified, it is given as with MINPARTSIZE as a round, whole number of megabytes. An example might be 600 for 600 megabytes. The partitioning process then takes the partition size and attempts to create the 'ghost' partition with that size. If the process cannot do so, it reduces the requested partition size by a megabyte at a time until it obtains the first size which does not conflict with the last data stored in the last shippable partition of the drive. As with the behavior of partition creation when only MINPARTSIZE is specified, if by some chance the downshifted value should fall below MINIPARTSIZE, the surrogate software generates an exception and halts the installation process—along with that line on the factory.

In FIG. 5, from step 376, the routine of FIG. 5 then proceeds to step 378 where it attempts to allocate the maximum partition size available. The routine then proceeds to step 380 where it checks if the partition has been successfully created. If not, the routine proceeds from step 380 to step 382 where it subtracts one megabyte from the maximum partition size. From step 382, the routine proceeds to step 384 where it checks if the maximum partition size is less than the required minimum partition size. Preferably, in the present invention, the minimum partition size is 25 megabytes. From step 384, in the event that the maximum partition size has not been reached, the routine loops back to step 378 to continue its attempt to allocate the maximum allowable partition size. Alternatively, in the event that the maximum partition possible size is less than the required minimum partition size in step 384, the routine proceeds to step 390 where it exits and indicates an error that it is out of disk space. Alternatively, from step 380, in the event that the partition was successfully created, the routine proceeds to step 386 where it saves the new partition in sector 0 and sector 3 of the hard drive 118 before the routine exits in step 388. Once the maximum ghost partition size has been determined, in the event that n ghost partitions are needed (in the preferred embodiment two are used), the size of each on the n ghost partitions can be established by dividing up the maximum ghost partition size as needed.

In this manner, the ghost partition allocation is performed at the end of the software download process. During the download process, the location of the last sector written to on the drive is saved to mark the end of the written part of the drive. After all files have been downloaded to the unit, the partition table which is preferably sector 0 of the drive 118 is stored in another sector, preferably sector 1 of the drive. Further, during this process, the DIAG.MAP file is read and the size of the ghost partition is determined based on the parameters given in the DIAG.MAP file. To allocate the ghost partition, the download tools will attempt to allocate the maximum size specified. If this fails, the ghost partition size to be allocated is decreased in one megabyte decrements until the ghost partition can be allocated. If the size to be allocated drops below a minimum partition size, the ghost partition allocation process is halted and an error message is displayed. After the partition has been allocated the files for the ghost partition are copied to the partition. The ghost partition table is then stored in another sector, preferably sector 4 for manufacturing diagnostics so it can be restored later, if needed.

Turning now to FIG. 6, the routine to perform diagnostics in a pre-test mode is illustrated in detail. In FIG. 6, from step 420, personnel at the factory insert a common surrogate diskette (CSD) which contains the diagnostic software and necessary files. From step 420, the routine proceeds to step 422, where the computer under test is powered on. From step 422, the routine proceeds to step 424, it boots from a floppy diskette. Next, in step 426, the routine executes on the hard drive 118 and boots Windows 95 with the Boot_GUI=0 in step 428. The setting of the Boot_GUI to zero causes Windows 95 to boot up DOS rather than the Windows interface.

From step 428, the routine proceeds to step 430 where it reads the serial number of the machine in the test from the floppy diskette. Further, from the AUTOEXEC.BAT the system executes a WINPREP software. The WINPREP software detects differences in the computer models and copies an appropriate registry to the host prior to booting. The software then reads the serial number from a SN.TXT file on the floppy diskette and creates a FACTORY.REG file in the Windows subdirectory. The serial number is then placed in a FACTORY.REG file in step 432. From step 432, the routine of FIG. 6 proceeds to step 434 where the routine WINPREP then uses the configuration code portion of the serial number to reference the correct REG file used to update the Windows registry file. The correct REG file is then renamed to a file called "UPDATE.REG" in step 434 for use in the following steps. From step 434, the routine of FIG. 6 proceeds to step 436 where it invokes a REGEDIT, a registry editor, to process UPDATE.REG as a parameter to update the registry files of Windows. From step 436, the routine of FIG. 6 proceeds to step 438 where it starts Windows 95 using a WIN command as the last command in the AUTOEXEC.BAT file. From step 438, the diagnostics are executed in step 440. The routine of FIG. 6 continues the diagnostics in step 440 until the testing processor is completed in step. 442. In that event, the routine of FIG. 6 proceeds from step 442 to step 444 where it reports errors and updates the test station data in the FACTORY.REG file before the routine of FIG. 6 exits in step 446.

Figure 7:
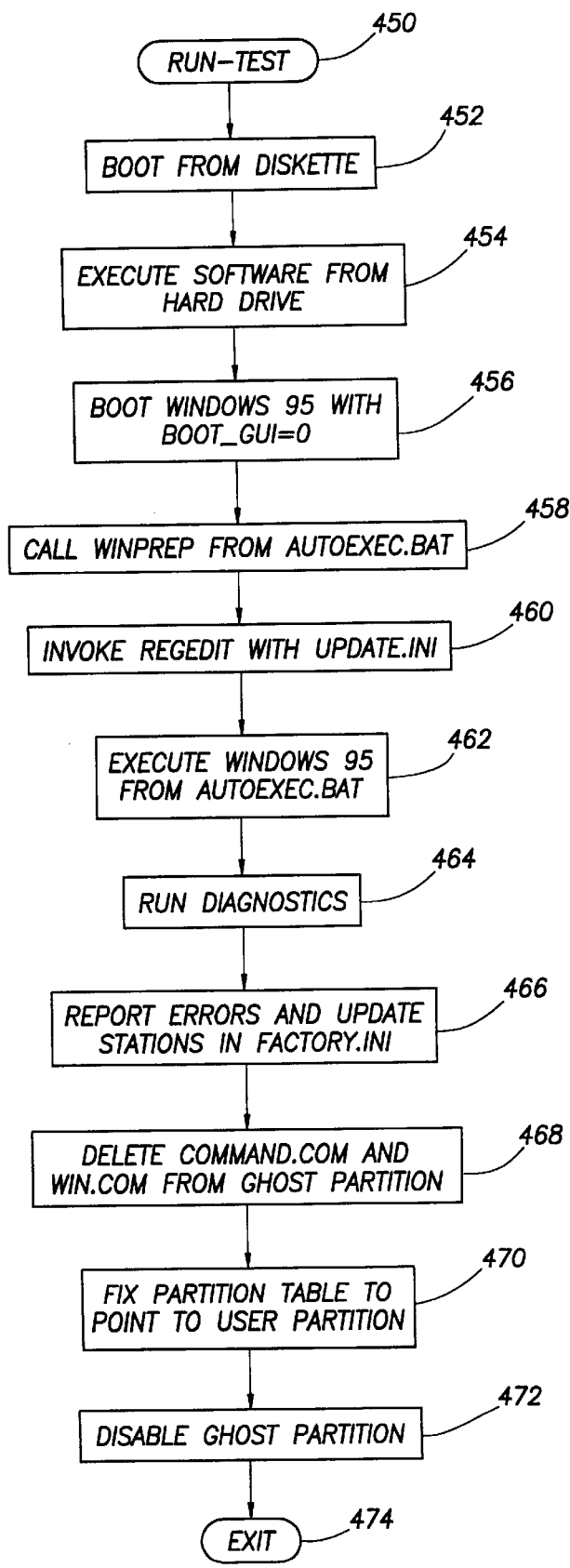
FIG. 7 is a flow chart illustrating the process at a run-in station for burning-in the computer under test.

Turning now to FIG. 7, the routine for performing the test during a testing period in the factory is illustrated in more detail. In FIG. 7, from step 450, the routine boots from the diskette in step 452. Next, the routine of FIG. 7 executes software from the hard drive in step 454. Next, the routine of FIG. 7 boots Windows 95 from AUTOEXEC.BAT with the Boot_GUI=0 to allow the system to get to the disk operating system.

From step 456, the AUTOEXEC calls the WINPREP software in step 458. WINPREP then determines that the serial number from SN.TXT file is not present on the floppy and hence it has nothing, except to copy an empty .REG file to the UPDATE.REG file for the next step. From step 460, Windows 95 is started using the WIN command as the last command in the AUTOEXEC.BAT file in step 462.

After step 462, the routine of FIG. 7 invokes the diagnostics of FIG. 2 in step 464. Once the diagnostics complete their operation, errors are reported and station information is updated in the FACTORY.REG file in step 466. From step 466, the routine of FIG. 7 then deletes the COMMAND-.COM and the WIN.COM from the ghost partition in step 468. From step 468, it then fixes the partition table to point to the use of partition in step 470 before the ghost partition is disabled in step 472. The ghost partition is disabled by modifying the partition table to point back to the user partition as the primary active partition. Once the ghost partition has been disabled in step 472, the routine of FIG. 7 exits in step 474. At this point, information stored on the ghost partition is no longer accessible by the user.

Figure 8:
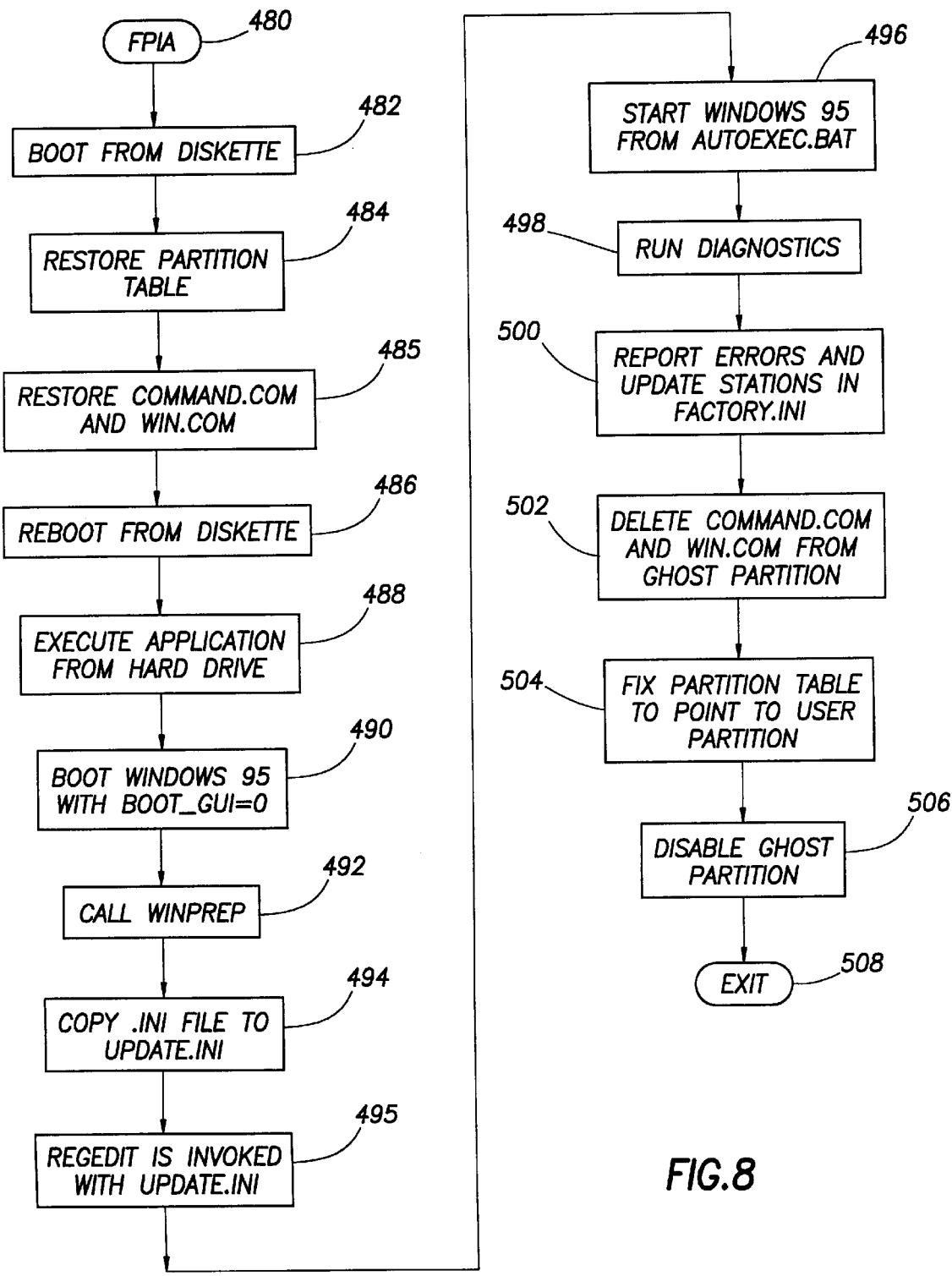
FIG. 8 is a flow chart illustrating the process for resurrecting the ghost partition after the burn-in process of FIG. 7.

Turning now to FIG. 8, the routine to retrieve diagnostic routines stored in the ghost partition after the ghost partition has been erased is illustrated in more detail. The process of FIG. 8 is necessary for factory quality control (QC) purposes, as the QC process requires a random sampling of the quality of the computers produced by the factory. The QC process requires that the computer system be retested during the random sampling process. As such, the diagnostics software located on the ghost partition deleted in FIG. 7 needs to be resurrected.

In FIG. 8, from the factory process integrated audit (FPIA) entry step 480, the routine powers on the computer system under test and boots from the floppy diskette in step 482. Next, from step 482, the routine restores the partition table in step 484 to re-enable the ghost partition. From step 484, the routine then restores the COMMAND.COM and the WIN.COM in step 485. This is accomplished by copying these two files from the floppy back to the ghost partition on the hard drive 118.

From step 485, the computer under test is rebooted in step 486. The application then is executed from the hard drive 118 in step 488. From step 488, the routine of FIG. 8 then boots Windows 95 with the BootGUI=0 to get the software back to the disk operating system. Next, from step 490, the routine calls WINPREP from the AUTOEXEC.BAT file in step 492. The WINPREP routine simply determines that the serial number from SN.TXT file is not present on the floppy disk. Hence, it does nothing except copy an empty.REG file to the UPDATE.REG file for the steps below. From step 494, the routine of FIG. 8 proceeds to step 495 where REGEDIT software is invoked with the UPDATE.REG as a parameter to update the Windows 95 registry. Next, from step 495, the routine of FIG. 8 proceeds to start Windows 95 using the WIN.COM as the last command in the AUTOEXEC.BAT file in step 496.

From step 496, the diagnostic software is executed in step 498. Next, errors are reported and stations are updated in the FACTORY.REG file in step 500. From step 500, the routine of FIG. 8 deletes COMMAND.COM and WIN.COM from the ghost partition in step 502. This step effectively disables the ghost partition from being able to boot up. Next, from step 502, the routine proceeds to step 504 to fix the partition table to point back to the user partition. The ghost partition is finally disabled in step 506 before the routine of FIG. 8 exits in step 508.

Thus, as demonstrated above, after completion of manufacturing diagnostics, the present invention replaces the original partition table with the saved version. No master boot records for any of the user or system partitions is modified at any time during the process. Additionally, the factory test team also clears out the master boot record (MBR) and file allocation table (FAT) for the ghost partition so test data cannot be accessed after the factory test processes. Hence, the present invention avoids the need to set up a large system partition and avoids wasting disk space associated with manufacturing diagnostics.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for storing software on a data storage device, comprising:

creating a user partition;

creating a ghost partition overlapping said user partition;

transferring said software to said ghost partition; and disabling said ghost partition after said ghost partition is not needed.

2. The method of claim 1, wherein said software is a diagnostics software.

3. The method of claim 1, wherein said ghost partition creating step creates a plurality of ghost partitions.

4. The method of claim 3, wherein one of said ghost partitions is adapted to contain diagnostics software and wherein another of said ghost partitions is adapted to contain download verification software.

5. The method of claim 1, further comprising the step of creating one or more master boot records (MBRs) on said data storage device.

6. The method of claim 5, wherein said data storage device is used in one or more phases, further comprising the step of creating one MBR for each of said phases.

7. The method of claim 5, further comprising an extended partition and a system partition, wherein said MBRs point to said user partition, said ghost partition, said system partition and said extended partition.

8. The method of claim 5, wherein said data storage device is used in a first phase and a second phase with corresponding MBRs, further comprising the step of copying the MBR for said second phase over the MBR for said first phase after the completion of said first phase.

9. The method of claim 1, further comprising the step of determining a minimum and maximum partition size for said ghost partition.

10. The method of claim 9, wherein said determining step further comprises:

(a) determining a last sector containing data;

(b) determining a minimum and maximum partition size for said ghost partition;

(c) allocating said maximum partition size;

(d) if said allocating step failed, subtracting a predetermined amount from said maximum partition size;

(e) repeating step (c) until said allocating step succeeds or until said subtracted maximum partition size equals said minimum partition size; and indicating an error if said minimum partition size exceeds said subtracted maximum partition size.

11. A program storage device having a computer readable code embodied therein for storing software on a data storage device, said program storage device comprising:

code for creating a user partition; and code for creating a ghost partition overlapping said user partition, said ghost partition adapted to receive said software, said ghost partition further adapted to be disabled after said ghost partition is no longer needed to release data storage space occupied by said ghost partition to said user partition.

12. The program storage device of claim 11, wherein said software is a diagnostics software.

13. The program storage device of claim 11, further comprising code for creating a plurality of ghost partitions.

14. The program storage device of claim 13, wherein one of said ghost partitions is adapted to contain diagnostics software and wherein another of said ghost partitions is adapted to contain download verification software.

15. The program storage device of claim 11, further comprising code for creating one or more master boot records (MBRs) on said data storage device.

16. The program storage device of claim 15, wherein said data storage device is used in one or more phases, further comprising a code for creating one MBR for each of said phases.

17. The program storage device of claim 15, further comprising an extended partition and a system partition, wherein said MBRs point to said user partition, said ghost partition, said system partition and said extended partition.

18. The program storage device of claim 15, wherein said data storage device is used in a first phase and a second phase with corresponding MBRs, further comprising a code for copying the MBR for said second phase over the MBR for said first phase after the completion of said first phase.

19. The program storage device of claim 11, wherein said ghost partition occupies a space between a minimum and a maximum partition size.

20. The program storage device of claim 19, wherein said maximum partition size is determined by iteratively subtracting a predetermined amount from said maximum partition size until said maximum partition size is allocable or until said minimum partition size exceeds said subtracted maximum partition size.

21. A computer system for downloading software to a disk drive, comprising:
   a processor; and
   a data storage device coupled to said processor, said data storage device having a computer readable code embodied therein for transferring software onto said disk drive, including:
      a code for creating a user partition on said disk drive;
      a code for creating a ghost partition overlapping said user partition on said disk drive;
      a code for transferring said software to said ghost partition; and
      a code for disabling said ghost partition after said ghost partition is not needed.

22. The computer system of claim 21 wherein said software is a diagnostics code.

23. The computer system of claim 21, wherein said ghost partition creating code creates a plurality of ghost partitions on said disk drive.

24. The computer system of claim 23, wherein one of said ghost partitions on said disk drive is adapted to contain diagnostics software and wherein another of said ghost partitions on said disk drive is adapted to contain download verification software.

25. The computer system of claim 21, further comprising a code for creating one or more master boot records (MBRs) on said disk drive.

26. The computer system of claim 25, wherein said data storage device is used in one or more phases, further comprising a code for creating one MBR for each of said phases.

27. The computer system of claim 25, further comprising an extended partition and a system partition on said disk drive, wherein said MBRs point to said user partition, said ghost partition, said system partition and said extended partition.

28. The computer system of claim 25, wherein said data storage device is used in a first phase and a second phase with corresponding MBRs, further comprising a code for copying the MBR for said second phase over the MBR for said first phase after the completion of said first phase.

29. The computer system of claim 21, further comprising a code for determining a minimum and maximum partition size for said ghost partition.

30. The computer system of claim 29, wherein said determining code further comprises:
   (a) a code for determining a last sector containing data;
   (b) a code for determining a minimum and maximum partition size for said ghost partition;
   (c) a code for allocating said maximum partition size;
   (d) a code for subtracting a predetermined amount from said maximum partition size if said allocating step failed;
   (e) a code for repeating code (c) until said allocating code succeeds or until said subtracted maximum partition size equals said minimum partition size; and
   a code for indicating an error if said minimum partition size exceeds said subtracted maximum partition size.

* * * * *

UNITED STATES PATENT AND TRADEMARK OFFICE
CERTIFICATE OF CORRECTION

PATENT NO.        : 5,974,567                                   Page 1 of 1
APPLICATION NO.   : 08/879912
DATED             : October 26, 1999
INVENTOR(S)       : Charles H. Dickson, Jr. et al.

It is certified that error appears in the above-identified patent and that said Letters Patent is hereby corrected as shown below:

IN THE CLAIMS

Column 20, Claim 20, Line 65-67, Delete "maximum partition size is allocable or until said minimum partition size exceeds said subtracted maximum partition size." and insert therefor --allocating step succeeds or until said subtracted maximum partition size exceeds said minimum partition size.--

Signed and Sealed this

Fifth Day of December, 2006

JON W. DUDAS
*Director of the United States Patent and Trademark Office*